US010396416B2

(12) United States Patent
Bowersock et al.

(10) Patent No.: US 10,396,416 B2
(45) Date of Patent: Aug. 27, 2019

(54) PASSIVE INSULATION MATERIALS

(71) Applicant: Thermal Ceramics, Inc., Augusta, GA (US)

(72) Inventors: Ricky Edward Bowersock, Augusta, GA (US); Gary Eugene Gayman, Augusta, GA (US); Jason Peter Street, Augusta, GA (US); Tord Per Onnerud, Wilton, CT (US); Jay Jie Shi, Acton, MA (US)

(73) Assignee: Thermal Ceramics, Inc., Augusta, GA (US)

( * ) Notice: Subject to any disclaimer, the term of this patent is extended or adjusted under 35 U.S.C. 154(b) by 207 days.

(21) Appl. No.: 15/312,345

(22) PCT Filed: May 21, 2015

(86) PCT No.: PCT/US2015/031899
§ 371 (c)(1),
(2) Date: Nov. 18, 2016

(87) PCT Pub. No.: WO2015/179597
PCT Pub. Date: Nov. 26, 2015

(65) Prior Publication Data
US 2017/0098806 A1 Apr. 6, 2017

Related U.S. Application Data

(60) Provisional application No. 62/107,630, filed on Jan. 26, 2015, provisional application No. 62/107,845, filed on Jan. 26, 2015, provisional application No. 61/997,082, filed on May 21, 2014.

(51) Int. Cl.
A62C 3/16 (2006.01)
C09K 5/18 (2006.01)
H01M 2/02 (2006.01)
H01M 2/10 (2006.01)
H01M 2/12 (2006.01)
A62C 99/00 (2010.01)
H01G 11/06 (2013.01)
H01G 11/10 (2013.01)
H01G 11/66 (2013.01)
H01G 11/74 (2013.01)
H01G 11/78 (2013.01)
H01M 10/617 (2014.01)
H01M 10/653 (2014.01)
H01M 10/658 (2014.01)
H01M 10/0525 (2010.01)
H01M 10/0587 (2010.01)

(52) U.S. Cl.
CPC .......... H01M 10/658 (2015.04); A62C 3/16 (2013.01); A62C 99/0018 (2013.01); C09K 5/18 (2013.01); H01G 11/06 (2013.01); H01G 11/10 (2013.01); H01G 11/66 (2013.01); H01G 11/74 (2013.01); H01G 11/78 (2013.01); H01M 2/02 (2013.01); H01M 2/0267 (2013.01); H01M 2/1016 (2013.01); H01M 2/1094 (2013.01); H01M 2/127 (2013.01); H01M 2/1258 (2013.01); H01M 10/0525 (2013.01); H01M 10/0587 (2013.01); H01M 10/617 (2015.04); H01M 10/653 (2015.04); H01M 2200/20 (2013.01); Y02T 10/7011 (2013.01)

(58) Field of Classification Search
CPC ............................... H01M 10/658; A62C 3/16
See application file for complete search history.

(56) References Cited

U.S. PATENT DOCUMENTS

| | | |
|---|---|---|
| 5,834,120 A | 11/1998 | Murray et al. |
| 2004/0253397 A1 | 12/2004 | Hayes |
| 2012/0028107 A1 | 2/2012 | Sugita et al. |
| 2012/0107547 A1 | 5/2012 | Fernando et al. |
| 2012/0115008 A1 | 5/2012 | Sano et al. |
| 2013/0071696 A1 | 3/2013 | Kim et al. |
| 2013/0216887 A1* | 8/2013 | Wayne ............... H01M 2/1061 429/120 |

FOREIGN PATENT DOCUMENTS

| | | |
|---|---|---|
| EP | 0132936 A1 | 2/1985 |
| EP | 2077592 | 7/2009 |
| JP | 2008117756 | 5/2008 |
| JP | 2009176455 A | 8/2009 |
| JP | 2010053196 A | 3/2010 |
| WO | 2011121901 | 10/2011 |
| WO | 2015179597 A1 | 11/2015 |
| WO | 2015179625 A1 | 11/2015 |

OTHER PUBLICATIONS

International Patent Application No. PCT/US2015/031899, International Search Report and Written Opinion dated Aug. 26, 2015.
Golubkov et al., Thermal-Runaway Experiments on Consumer Li-Ion Batteries with Metal-Oxide and Olivin-Type Cathodes, RSC Adv., 2014, 4, 3633-3642.
Roth et al., How Electrolytes Influence Battery Safety, The Electrochemical Society Interface, Summer 2012, 45-49.
Europe Patent Application No. 15727207.1, Communication pursuant to Article 94(3) EPC, dated Dec. 14, 2017.

(Continued)

Primary Examiner — Matthew J Merkling
(74) Attorney, Agent, or Firm — Kilpatrick Townsend & Stockton LLP; Dean W. Russell; Kristin M. Crall

(57) ABSTRACT

A material consisting of an insulating, ceramic-based matrix into which an endothermic gas-generating material is incorporated for the intended purpose of protecting electrical energy storage devices from cascading thermal runaway.

16 Claims, No Drawings

(56) References Cited

OTHER PUBLICATIONS

Europe Patent Application No. 15727207.1, Communication pursuant to Article 94(3) EPC, dated Jun. 28, 2018.
Europe Patent Application No. 15727207.1, Communication pursuant to Article 94(3) EPC (Office Action), dated Feb. 4, 2019.
Japan Patent Application No. 2017-513606, Preliminary Notice of Reasons for Rejection (Office Action), dated Jan. 29, 2019.

* cited by examiner

PASSIVE INSULATION MATERIALS

CROSS-REFERENCE TO RELATED APPLICATIONS

This application is the U.S. national phase entry of International Patent Application No. PCT/US2015/031899, filed on May 21, 2015; which application claims priority benefits from U.S. Provisional Patent Application No. 62/107,845, filed on Jan. 26, 2015; U.S. Provisional Patent Application No. 62/107,630, filed on Jan. 26, 2015; and U.S. Provisional Patent Application No. 61/997,082, filed on May 21, 2014; the entire contents of each of which are hereby incorporated by reference.

FIELD OF THE INVENTION

This disclosure relates to a thermal insulation material for protection against thermal runaway in electrical energy storage devices.

BACKGROUND

Electrical energy storage devices may fail in operation, and this can result in an uncontrolled release of stored energy that can create localized areas of very high temperatures. For example, various types of cells have been shown to produce temperatures in the region of 600-900° C. in so-called "thermal runaway" conditions [Andrey W. Golubkov et al, *Thermal-runaway experiments on consumer Li-ion batteries with metal-oxide and olivin-type cathodes* RSC Adv., 2014, 4, 3633-3642].

Such high temperatures may ignite adjacent combustibles thereby creating a fire hazard. Elevated temperature may also cause some materials to begin to decompose and generate gas. Gases generated during such events can be toxic and/or flammable, further increasing the hazards associated with thermal runaway events.

Lithium ion cells may use organic electrolytes that have high volatility and flammability. Such electrolytes tend to start breaking down at temperatures starting in the region 150° C. to 200° C. and in any event have a significant vapour pressure even before break down starts. Once breakdown commences the gas mixtures produced (typically a mixture of $CO_2$, $CH_4$, $C_2H_4$, $C_2H_5F$ and others) can ignite. The generation of such gases on breakdown of the electrolyte leads to an increase in pressure and the gases are generally vented to atmosphere; however this venting process is hazardous as the dilution of the gases with air can lead to formation of an explosive fuel-air mixture that if ignited can flame back into the cell in question igniting the whole arrangement.

It has been proposed to incorporate flame retardant additives into the electrolyte, or to use inherently non-flammable electrolyte, but this can compromise the efficiency of the lithium ion cell [E. Peter Roth etal, *How Electrolytes Influence Battery Safety*, The Electrochemical Society Interface, Summer 2012, 45-49].

It should be noted that in addition to flammable gases, breakdown may also release toxic gases.

The issue of thermal runaway becomes compounded in devices comprising a plurality of cells, since adjacent cells may absorb enough energy from the event to rise above their designed operating temperatures and so be triggered to enter into thermal runaway. This can result in a chain reaction in which storage devices enter into a cascading series of thermal runaways, as one cell ignites adjacent cells.

To prevent such cascading thermal runaway events from occurring, storage devices are typically designed to either keep the energy stored sufficiently low, or employ enough insulation between cells to insulate them from thermal events that may occur in an adjacent cell, or a combination thereof. The former severely limits the amount of energy that could potentially be stored in such a device. The latter limits how close cells can be placed and thereby limits the effective energy density.

There are currently a number of different methodologies employed by designers to maximize energy density while guarding against cascading thermal runaway.

One method is to employ a cooling mechanism by which energy released during thermal events is actively removed from the affected area and released at another location, typically outside the storage device. This approach is considered an active protection system because its success relies on the function of another system to be effective. Such a system is not fail safe since it needs intervention by another system Cooling systems also add weight to the total energy storage system thereby reducing the effectiveness of the storage devices for those applications where they are being used to provide motion (e.g. electric vehicles). The space the cooling system displaces within the storage device may also reduce the potential energy density that could be achieved.

A second approach employed to prevent cascading thermal runaway is to incorporate a sufficient amount of insulation between cells or clusters of cells that the rate of thermal heat transfer during a thermal event is sufficiently low enough to allow the heat to be diffused through the entire thermal mass of the cell typically by conduction. This approach is considered a passive method and is generally thought to be more desired from a safety vantage. In this approach the ability of the insulating material to contain the heat, combined with the mass of insulation required dictate the upper limits of the energy density that can be achieved.

A third approach is through the use of phase change materials. These materials undergo an endothermic phase change upon reaching a certain elevated temperature. The endothermic phase change absorbs a portion of the heat being generated and thereby cools the localized region. This approach is also a passive in nature and does not rely on outside mechanical systems to function. Typically, for electrical storage devices these phase change materials rely on hydrocarbon materials such as waxes and fatty acids for example. These systems are effective at cooling, but are themselves combustible and therefore are not beneficial in preventing thermal runaway once ignition within the storage device does occur.

A forth method for preventing cascading thermal runaway is through the incorporation of intumescent materials. These materials expand above a specified temperature producing a char that is designed to be lightweight and provide thermal insulation when needed. These materials can be effective in providing insulating benefits, but the expansion of the material must be accounted for in the design of the storage device.

There is therefore an unfulfilled need for a method to limit cascading thermal runaway in energy storage devices that mitigates the problems of previous proposals.

BRIEF SUMMARY

The present disclosure invention provides (in various forms) materials comprising a ceramic matrix that incorporates an inorganic gas-generating endothermic material. If during application the temperature rises above a maximum level associated with normal operation the invention serves to provide a number of functions for the purposes of preventing thermal runaway. These include: providing thermal insulation at high temperatures; energy absorption; initializing the venting process for gases produced in runaway, by raising total pressure; removal of absorbed heat from the system via venting of gases produced during the endothermic reaction; and the dilution of toxic gases if present and their safe expulsion from the device.

DETAILED DESCRIPTION

The thermal insulating characteristics of the disclosure are novel in their combination of properties at different stages of their application. In the as-made state the materials provide thermal insulation during small temperature rises or during the initial segments of a thermal event. At these relatively low temperatures the insulation serves to contain the heat generation while allowing limited conduction to slowly diffuse the thermal energy to the whole of the thermal mass. At these low temperatures the materials are designed not to undergo any endothermic gas-generating reactions. This provides a window to allow for temperature excursions without causing any permanent damage to the insulation. For lithium ion type storage devices the general range associated as excursions or low-level rises are between 60° C. and 200° C. Through the selection of the correct inorganic endothermic material the designer can choose to initiate the second endothermic function at a temperature of their choosing. The nature of typically inorganic endothermic materials for this disclosure typically range from 60° C. to significantly above 200° C. and exemplar materials include but are not limited to those materials in Table 1.

TABLE 1

| Mineral | Chemical Formula | Approximate onset of Decomposition (° C.) |
| --- | --- | --- |
| Nesquehonite | $MgCO_3 \cdot 3H_2O$ | 70-100 |
| Gypsum | $CaSO_4 \cdot 2H_2O$ | 60-130 |
| Magnesium phosphate octahydrate | $Mg_3(PO_4)_2 \cdot 8H_2O$ | 140-150 |
| Aluminium hydroxide | $Al(OH)_3$ | 180-200 |
| Hydromagnesite | $Mg_5(CO_3)_4(OH)_2 \cdot 4H_2O$ | 220-240 |
| Dawsonite | $NaAl(OH)_2CO_3$ | 240-260 |
| Magnesium hydroxide | $Mg(OH)_2$ | 300-320 |
| Magnesium carbonate subhydrate | $MgO \cdot CO_{2(0.96)}H_2O_{(0.3)}$ | 340-350 |
| Boehmite | $AlO(OH)$ | 340-350 |
| Calcium hydroxide | $Ca(OH)_2$ | 430-450 |

These endothermic materials typically contain hydroxyl or hydrous components possibly in combination with other carbonates or sulphates. Alternative materials include non-hydrous carbonates, sulphates and phosphates. A common example would be sodium bicarbonate which decomposes above 50° C. to give sodium carbonate, carbon dioxide and water. If a thermal event does result in a temperature rise above the activation temperature of the selected endothermic gas-generating material then the material is designed to begin absorbing thermal energy and thereby provide both cooling as well as thermal insulation. The amount of energy absorption possible depends on the amount and type of endothermic gas-generating material incorporated into the formula. The exact amount of addition and type(s) for a given application are selected to work in concert with the insulating material such that the heat absorbed is sufficient to allow the insulating material to conduct the remaining entrapped heat to the whole of the thermal mass of the energy storage device.

By distributing the heat to the whole thermal mass in a controlled manner the temperature of the adjacent cells can be kept below the critical decomposition or ignition temperatures. However, if the heat flow through the insulating material is too conducting then adjacent cells will reach decomposition or ignition temperatures before the mass as a whole can dissipate the stored heat.

The endothermic material may be a single material or mixture of endothermic materials.

It should be noted that some materials have more than one decomposition temperature. For example hydromagnesite referred to above as having a decomposition temperature starting in the range 220-240° C. decomposes in steps: first by release of water of crystallisation at about 220° C.; then at about 330° C. by breakdown of hydroxide ions to release more water; then at about 350° C. to release carbon dioxide. However, these steps in decomposition are fixed and do not permit control of at what temperatures heat is absorbed and at what temperatures gas is generated.

By use of a mixture of two or more endothermic materials having different decomposition temperatures the cooling effect can be controlled over a wider temperature range than with one material alone. The two or more endothermic materials may comprise one or more non-gas generating endothermic materials in combination with one or more gas-generating materials.

By use of a mixture of two or more endothermic materials evolving gas at different decomposition temperatures, the production of gas can be controlled over a wider temperature range than with one material alone.

The number and nature of endothermic materials used can hence be tailored to give tailored heat absorption and gas evolution profiles.

Such tailoring of heat absorption and gas evolution profiles by mixing different endothermic materials allows the control of the evolution of temperature and pressure to meet design requirements of the apparatus in which the material is used.

For example, sodium bicarbonate may be combined with $Al(OH)_3$ [also known as ATH (aluminum trihydrate)] to provide a dual response endothermic material/system according to the present disclosure. In such exemplary implementation, the sodium bicarbonate can be expected to begin absorbing energy and evolving gas slightly above 50° C., whereas ATH would not begin absorbing energy and evolving gas until the system temperature reached approximately 180-200° C.

The insulating materials of this disclosure are designed to be thermally stable against excessive shrinkage during the entire temperature range of a typical thermal event which can reach temperatures in excess of 900° C. This is in contrast to many other materials based on low melting glass fibers, carbon fiber, or fillers which shrink extensively and even ignite at temperatures above 300° C.: and is distinguished from intumescent materials, since the presently claimed materials do not require design of device components to withstand expansion pressure. Unlike other energy storage insulation systems using phase change materials, the materials of this disclosure are not organic and hence do not combust when exposed to oxygen at elevated temperatures. The evolution of gas with its dual purpose of removing heat and diluting any toxic gases from the energy storage devices is novel.

The material of the disclosure desirably provides mechanical strength and stability to the device in which it is used. The materials of the disclosure may have a high porosity allowing the material to be slightly compressible. This can be of benefit during assembly because parts can be press fit together, resulting in a very tightly held package. This in turn provides vibrational and shock resistance desired for automotive, aerospace and industrial environments.

The mechanical properties of the material of the disclosure change if a thermal event occurs of sufficient magnitude that the endothermic reaction occurs. The evolution of gases may reduce the mechanical ability of the materials of the disclosure to maintain the initial assembled pressure. However, storage devices which experience thermal events will by definition no longer be fit-for-service and therefore the change can be accepted for most applications. The evolution of gas leaves behind a porous insulating matrix.

The gases produced by the endothermic gas-generating materials include (but are not limited to) $CO_2$, $H_2O$, or a combination thereof. The evolution of these gases provides for a series of subsequent functions. First, the generation of gases between an upper normal operating temperature and a higher threshold temperature above which the devices are liable to thermal runaway can function as a means of forcing a venting system for the energy storage device to open.

The generation of the gases may serve to partially dilute any toxic and corrosive vapors generated during a thermal event. Once the venting system activates, the gases serve to carry out heat energy as they exit out of the device through the venting system. The generation of gases by the endothermic material also helps to force the toxic gases out of the energy storage device through the venting system.

By diluting any gases formed during thermal runaway, the potential for ignition of the gases is reduced.

Examples of the invention can be formed in a number of manners that all result in the novel performance characteristics of prescribed to this disclosure. These include dry pressing, vacuum forming, infiltration and direct injection as outlined below.

DESCRIPTION OF PREFERRED EMBODIMENTS

The performance during thermal runaway of an insulation without an endothermic gas-generating material is significantly worse than that of an insulation with an endothermic gas-generating material. For lithium ion storage devices the 200-250° C. temperature range is considered dangerous for the onset of thermal runaway.

In comparative tests of maintenance free battery constructions comprising 6 5Ah Li-ion cells housed in respectively:

insulation comprising an endothermic gas-generating material [Reference M1—see also Table 10 below]; and insulation without an endothermic gas-generating material [Reference M2 —a vacuum formed and thermally bonded board];

a single cell was damaged to induce runaway and temparatures measured of that cell and adjacent cells.

The results of Table 2 were obtained:

TABLE 2

| | Housing material | M1 | M2 | % temperature reduction |
|---|---|---|---|---|
| Maximum temperature reached (° C.) | Incident cell (#3) | 493 | 659 | −25% |
| | Neighboring cell (#2) | 67 | 168 | −60% |
| | Neighboring cell (#4) | 67 | 204 | −67% |

These results demonstrate clearly:
the significant reduction (25%) in maximum temperature of the damaged (incident) cell;
the dramatic reduction (60% or more) in maximum temperature of the neighboring cells;
consequent on inclusion of the endothermic gas-generating material.

It should be noted that with endothermic gas-generating material neighboring cells were maintained well below 200° C. whereas without the endothermic gas-generating material the temperature of neighboring cells approached or exceeded 200° C.

The insulating material of the present disclosure contains a ceramic insulating matrix in combination with an inorganic endothermic material selected to produce off-gassing at temperatures above normal operating temperatures but lower than a predetermined temperature liable to lead to thermal runaway due to heating.

The amount of endothermic material is above zero and at an amount effective to provide some heat-carrying and gas-diluting effect. As low as 1% by weight gas-generating endothermic material may be effective dependent upon device design, but higher quantities will typically be required and/or desired.

Typically the ratio of ceramic matrix to endothermic material may be in the range 1:19 to 9:1 by weight and may be in the range 1:9 to 6:4 by weight.

The ceramic matrix typically comprises inorganic fibers, and binders, and may include particulate materials.

The particulate materials may be microporous in nature, and may comprise fumed ceramics, opacifiers, and mixtures thereof.

The binders may comprise liquid binders, dry binders or both: and may be inorganic, organic, or both.

Opacifiers may be present.

Dependent on product form the material may comprise water or other solvent as a constituent.

A typical mix might be that of Table 3:

TABLE 3

| Material Category | % by weight |
|---|---|
| Ceramic Oxide Powder | 0-60 wt % |
| Opacifier | 0-30 wt % |
| Endothermic Material | 10-90 wt % |
| Dry Binder | 0-10 wt % |
| Liquid Binder | 0-60 wt % |
| Fiber | 0-60% | with the above named components amounting to greater than 60%, greater than 70%, greater than 80%, or greater than 90% of the composition. The proportions of the components may vary according to product form.

Inorganic fibers function to provide structural strength, insulating properties and to limit shrinkage at elevated temperatures. The structural strength the fibers impart allows for the insulation materials to resist flexural stresses that may cause excessive cracking either during normal operation or during thermal events. Since the fibers are not organic or pure-carbon based they will not combust and hence will not contribute to exothermic heat generation. During elevated temperature excursions the fibers will serve to hold the matrix together due to their refractory nature unlike those that combust or melt at temperatures less than the 900° C. often achieved during thermal events. Fibers that could be employed include ceramic, E-glass, S-Glass, polycrystalline, phosphoric, leached silica, quartz or zirconia. Depending on design criteria, inorganic fibers may be absent but typically are present in amounts of 3% or more.

Microporous insulating materials typically comprise inorganic oxides in which the pore size is so small that it interferes with the mean free path of gas due to convection, while also minimizing conduction through minimizing contact points between the particles. Typical materials utilized for microporous materials are ceramic oxide powders, for example fumed silica, fumed alumina, fumed zirconia, or mixtures thereof. The amount of microporous material necessary for this disclosure is a function of the exact nature of the energy storage assembly and the disclosure encompasses embodiments with no microporous material through to embodiments with up to 60% microporous material.

The purpose of the microporous component is insulate the affected cell to a level that the heat flux that does flow outward is sufficiently low that it can be conveyed through the whole of the assembly by conduction without raising any point outside the affected cell above the thermal ignition point. For example purposes, if the material are insulating sufficiently small cells or those with low energy capacity then very little if any microporous material would be needed. The insulating characteristics of the ceramic fiber matrix materials may be enough. If however the insulated cell contains a high level of potential thermal energy then a very high amount of microporous material may be necessary to prevent adjacent cells to from rising above the ignition temperatures while also providing time for the endothermic materials to react and absorb energy if the temperatures become high enough.

The opacifier is a component that may augment the performance of the insulating material during thermal upset conditions where the temperatures rise into the levels of radiant heat. The need for opacifiers is dependent upon the heat release characteristics of the energy storage device analogous to the description above for the microporous component. If the temperatures during a thermal event are sufficiently high to reach radiant heat temperatures then an opacifier will help to slow transmission of any radiant heat generated. In this application, neither the microporous material, the fiber matrix nor a combination thereof is effective against radiant heat transfers by themselves. Common opacifier materials include $TiO_2$, silicon, alumina, clay (which may function both as opacifier and binder), SiC and heavy metal oxides. These opacifiers do not provide any function to the disclosure at normal operating temperatures or even at lower temperatures during a thermal event. The opacifiers tend to be high in cost and very dense and therefore add weight to the storage device. Depending upon the design of the energy storage unit and the nature of the heat release during a thermal event the necessary range for opacifier additions can range from 0 to 30 percent.

The endothermic material constituent is a necessary part of this disclosure. It is known that most energy storage devices function well at 60° C. or below. The endothermic material of this disclosure is designed to begin its reaction above this temperature, but preferably low enough that it can begin absorbing heat energy generated during a thermal event at the initial moments of such an event to minimize temperature rise in the affected cells and adjacent cells. Upon exceeding a set level above the normal operating temperature the endothermic material absorbs heat and evolves gas. The evolving gas serves to dilute, neutralize and carry away heat. Also, the sudden generation of heat can be used to signal or cause the vents in energy storage devices to begin venting. The amount of endothermic material needed depends upon device configuration, energy density and thermal conductivity of the remainder of the insulating material components. Materials with 76% or more by weight endothermic gas-generating material are contemplated.

The amount of endothermic gas-generating material may also be regulated to achieve a desired volume of gas generation and the selection of type can be used to set the temperature at which the endothermic gas generation should occur. In highly insulating systems a higher temperature may be desired whereas in less insulating systems a lower temperature may be needed to prevent temperatures in neighboring cells reaching critical ignition temperature. Typical inorganic endothermic materials that would meet these requirements include, but not limited to include those mentioned above.

The binder phase of the insulation can be inorganic or organic in nature, but is preferably inorganic. The intent of the binder phase in to provide adequate structural integrity to assemble the device, hold the cells in place during normal and optionally to provide mechanical stability during a thermal event. The type and amount of binder can be varied to allow for the desired rigidity necessary for assembly and in-service mechanical performance. An example of a binder that would allow a highly flexible insulation material would be latex. Starch could be used to produce more rigid formations. Thermosetting binders may also be utilized, especially when high levels of microporous are utilized. For those applications where organic binders are not desirable then inorganic binders such as, but not limited to sodium silicate, potassium silicate, colloidal silica and colloidal alumina. Refractory clays such a kaolin may also be used as binders. These clays also contain water, which at highly elevated temperatures volatizes off in an endothermic manner providing further benefit. All of the inorganic binders can be added to the insulating material either in solution/suspension or in a dry form depending upon the forming process employed.

Not all constituent materials in the examples described are compatible with the commonly applied manufacturing routes. For this reason the design requirements of a particular energy storage device may dictate the manufacturing route necessary. For this reason four different manufacturing methodology/formulation combinations are described below.

Dry Pressing

One method of manufacture is to first dry blend the constituents together and then press them into a desired initial shape under high pressures until a microporous structure is formed. If high green strengths are desired then a dry thermosetting binder can be added in the blending step, in which case the shape is held at temperatures below that at which gas would evolve from the endothermic material, but high enough to set the thermosetting binder. This can be done either during the pressing step or afterward. Once completed, the resulting shape can be machined to the specified design. A typical formulation for this manufacturing route is given below.

TABLE 4

Typical dry pressed shape formulation

| Material Category | % by weight |
| --- | --- |
| Ceramic Powder | 0-60 wt % |
| Opacifier | 0-30 wt % |
| Endothermic Material | 10-60 wt % |
| Dry Binder | 0-10 wt % |
| Fiber | 3-15 wt % |

Infiltration of a Preform

In this method, the product is formed in a process in which a fiber component is first preformed into a shape (preform), and then subsequently infiltrated with a suspension containing the remaining constituents.

The preform may be created using commonly applied vacuum forming techniques employed by other industries such as pulp molding, paper and ceramic fiber shapes. In these processes a dilute suspension of the fiber component in a liquid (a slurry) is exposed to a mesh screen upon which the slurry constituents build up as the liquid (typically water) is drawn through. The exact concentration of the slurry varies to match the process being used and fiber properties. An organic or inorganic binder may also be incorporated into this step. Once the shape (or flat material) builds to a desired thickness it is removed from the suspension and dried until sufficient handling strength and open porosity is achieved to allow for infiltration.

Infiltration may be accomplished by submerging the preform (or flat material) into a suspension of the remaining non-fiber constituents of the invention. Capillary action draws the suspension into the porosity, displacing air in the process. Infiltration can be assisted through the application of either vacuum or pressure if needed. The infiltrated part is then dried to remove water. Once water is removed the binder (if present) will harden. The resultant material can then be further machined and/or processed if required; or used as is if appropriate.

This manufacturing route lends itself to producing formulations with high endothermic material loading, readily achieving an 80% loading and extendable to higher loadings still. Table 5 shows the dry ingredients of a typical fiber preform (where there is reference to liquid binder, this means the set residue of a liquid binder).

TABLE 5

Typical fiber preform formulation (dry)

| Material Category | % by weight |
| --- | --- |
| Ceramic Oxide Powder | — |
| Opacifier | — |
| Endothermic Material | — |
| Dry Binder | 0-10 wt % |
| Liquid Binder | 10-40 wt % |
| Fiber | 50-90 wt % |

Table 6 show a typical infiltration suspension (where there is reference to liquid binder, this means the liquid binder before setting).

TABLE 6 typical infiltration suspension

| Material Category | % by weight |
| --- | --- |
| Ceramic Oxide Powder | — |
| Opacifier | 0-20 wt % |
| Endothermic Material | 40-85 wt % |
| Dry Binder | 0-5 wt % |
| Liquid Binder | 0-40 wt % |
| Fiber | — |
| Water | 15-45 wt % |

A typical composition for the resulting final shape of the invention produced by this manufacturing route is given in Table 7 (where there is reference to liquid binder, this means the set residue of a liquid binder).

TABLE 7 typical final formulations for infiltrated part

| Material Category | % by weight |
| --- | --- |
| Ceramic Oxide Powder | — |
| Opacifier | 0-16 wt % |
| Endothermic Material | 32-80 wt % |
| Dry Binder | 0-5 wt % |
| Liquid Binder | 2-40 wt % |
| Fiber | 10-18 wt % |

Vacuum Forming

One characteristic of the infiltration technique is the presence of a concentration gradient of the non-fiber constituents. The concentration is greatest on the outer surfaces and decreases towards the center. This is caused by the insulating matrix acting as a filter and restricting infiltrate as it travels further the surface. One-method for reducing non-uniform distribution is to form the part with all the constituents in one step. In this manufacturing method all of the constituent materials are introduced into the initial dilute slurry suspension. The suspension is then formed into the desired shape (or flat material) via standard vacuum forming techniques commonly applied in pulp molding, paper and ceramic fiber industries. The resulting part or paper is then dried and can be used as made, or further machined. This technique has the advantage of producing a more homogenous shape, but is not well suited for producing formulations with very high loadings of non-fiber constituents. This is due to blinding of the forming screens that interferes with the ability of the suspension to be pulled through. This technique is therefore more applicable to thin products such as papers, or near net shapes where the cross sections are less than 10 mm. in thickness The use of a water suspension precludes the use of fumed oxides because these materials cannot create microporous structures once exposed to water.

Table 8 shows typical vacuum formed shape chemistry excluding process water and in which where there is reference to liquid binder, this means the unset liquid binder.

TABLE 8

Typical vacuum formed shape chemistry

| Material Category | % by weight |
| --- | --- |
| Ceramic Oxide Powder | — |
| Opacifier | 0-30 wt % |
| Endothermic Material | 10-85 wt % |
| Dry Binder | 0-10 wt % |

TABLE 8-continued

Typical vacuum formed shape chemistry

| Material Category | % by weight |
|---|---|
| Liquid Binder | 3-15 wt % |
| Fiber | 3-60 wt % |

Mouldable Products

The products of the disclosure can also be made as a moldable material for use in forming the assembly of the energy storage device instead of in the form of an article. The manufacturing of the moldable version typically starts with wet mixing constituents in a mixer until well mixed (e.g. for approximately 10 minutes). A biocide may be added at this point to prevent mold growth during storage. pH modifiers may be included if required. Once mixing is complete the mouldable products can then be packaged into caulking tubes or drums for storage and distribution prior to assembly. During assembly the mouldable may be injected, pressed, or otherwise placed into the areas to be insulated and the resultant assembly dried to remove water. Typically, if an inorganic binder is used then the dried part will adhere very tightly to the non-insulation components adding to the structural integrity of the device. Such a moldable invention requires little or no additional machining after drying.

A typical formulation for the moldable production method in given in Table 9. Due to the nature of fumed ceramic oxides they cannot be wet processed with water, so this manufacturing method normally precludes their incorporation into the invention.

TABLE 9

Typical mouldable formulation

| Material Category | % by weight |
|---|---|
| Ceramic Oxide Powder | — |
| Opacifier | 0-15 wt % |
| Endothermic Material | 10-60 wt % |
| Clay Binder | 0-10 wt % |
| Liquid Binder | 5-60 wt % |
| Fiber | 0-10 wt % |
| Added Liquid (e.g. Water) | 0-70 wt % |

It should be noted that the liquid present may comprised the liquid binder, or also comprise added liquid. Setting agents for the liquid binder may be included in the added liquid Other Forms The materials may be in the form of a foam that is either chemically and/or mechanically foamed. Foamed ceramics are known for insulation purposes [e.g. U.S. Pat. No. 4,596,834] and the endothermic material may comprise part of the constituents of the foam and/or be subsequently impregnated into the foam. Compositions similar to the mouldable composition may be foamed.

Typical Compositions

In Table 10 are given exemplary compositions that have been demonstrated to work in the present application.

TABLE 10

| | | Product reference | | | |
|---|---|---|---|---|---|
| | | M1 | M7 | M6 | M3 |
| Material Category | Description | Pressed Shape | Injectable Paste | Infiltrated Board | Vacuum Shape or Paper |
| Ceramic Oxide Powder | Fumed silica type P | 36.50 | 0.00 | 0.00 | 0.00 |
| Ceramic Oxide Powder | Micronized silica | 7.50 | 0.00 | 0.00 | 0.00 |
| Endothermic Material | Alumina Trihydrate | 49.00 | 47.00 | 80.00 | 72.40 |
| Binder | Heat Set Resin binder | 2.00 | 0.00 | 0.00 | 0.00 |
| Binder | Latex Binder | 0.00 | 0.00 | 0.00 | 6.11 |
| Binder | Potassium Silicate (48% solids content) | 0.00 | 10.00 | 0.00 | 0.00 |
| Binder | Colloidal Silica | 0.00 | 0.00 | 4.72 | 1.36 |
| (Stabilizer for Binder) | HCl (20% Solution) | 0.00 | 40.00 | 0.00 | 0.00 |
| Binder | Starch | 0.00 | 0.00 | 1.57 | 0.00 |
| Fiber | SUPERWOOL ® plus bulk fiber (alkaline earth silicate fiber) | 0.00 | 3.00 | 10.24 | 20.14 |
| Fiber | ½" E-glass | 1.00 | 0.00 | 0.00 | 0.00 |
| Fiber | Denka B97T4 Alumina Fiber | 4.00 | 0.00 | 3.46 | 0.00 |

Nature of Shaped Material

The above description refers to forming shapes, including flat shapes such as boards and papers. These shapes for the present application may have particular forms. For example the shapes may comprise:
- a body of material having a recess shaped to receive an energy storage device;
- a body of material having a plurality of recesses each shaped to receive an energy storage device;
- a material having two or more regions having different concentrations of endothermic gas-generating material;
- a material having a gradient of endothermic gas-generating material;
- a material comprising a surface region of the material having a higher concentration of endothermic gas-generating material than a region within the body of the material;
- a material comprising a surface region of the material having a higher concentration of endothermic gas-generating material than a different surface region of the material.

Choice of Material

As indicated above, the product form of the material depends on application. The following are factors that could drive the choice of one or other of the above mentioned product forms and material constituents:
- A brittle material may be more liable to cracking than a material that can be deformed without cracks during mechanical abuse, since cracking may provide an easy path for escape of heat/gas.
- A material that is deformable is less likely than a rigid material to penetrate the jelly rolls and cause internal shorts.
- A rigid/hard material can increase the strength of the insulation and any device including it, so that a crash can be mitigated and protect the jelly roll.
- Once the cell or module is deformed, it may be desirable that the endothermal protection remains as homogenous as possible, so that thermal protection is intact.
- If the endothermic material/system contains water and is to be used with an energy storage device sensitive to water, the vapor pressure of water associated with the endothermic material/system in normal operating temperatures of the associated electrical storage device is desirably low.
- Differing regions of a device comprising a plurality of electrical storage devices may require different levels of endothermic materials and so a material having different concentrations of endothermic material through its extent may be applied. For example the material may comprise:
  - a surface region having a higher concentration of endothermic gas-generating material than a region within the body of the material; and/or
  - a surface region having a higher concentration of endothermic gas-generating material than a different surface region of the material The above description is not limitative of the invention and the person of ordinary skill in the art of insulation will conceive variants while still falling within the scope of the invention.

The invention claimed is:

1. An energy storage device housing for an energy storage device, comprising
   (a) a plurality of electrical cells;
   (b) a material for limiting thermal runaway in the device, the cells having an upper normal operating temperature and a higher threshold temperature above which the cells are liable to thermal runaway, the material comprising a ceramic matrix that incorporates an inorganic gas-generating endothermic material, and in which:
   - the ceramic matrix is capable of providing thermal insulation properties at and above the upper normal operating temperature;
   - the gas-generating endothermic material is selected to undergo one or more endothermic reactions between the upper normal operating temperature and the higher threshold temperature;
   - one or more of said reactions results in the evolution of gases;
   - the ceramic matrix has sufficient porosity to permit said gases to vent from the material and thereby remove heat from the material; and
   (c) a venting system forcibly openable by the generation of the gases, wherein the venting system forms part of the housing, with evolution of gases from an incident cell being releasable through the vent so as to prevent neighboring cells from reaching a critical ignition temperature,
   wherein the material for limiting thermal runaway in the device comprises a formulation of:
   Ceramic Oxide: 0-60 wt %
   Opacifier: 0-30 wt %
   Endothermic material: 10-90 wt %
   Dry Binder: 0-10 wt %
   Liquid Binder: 0-60 wt %
   Fibre: 0-60 wt %
   with the above formulation amounting to greater than 60%, greater than 70%, greater than 80%, or greater than 90% of the composition.

2. The device as claimed in claim 1, in which the material has a ratio of ceramic matrix to endothermic material in the range 1:19 to 9:1 by weight.

3. The device as claimed in claim 2, in which the materials has a ratio of ceramic matrix to endothermic material in the range 1:9 to 6:4 by weight.

4. The device as claimed in claim 1, in which the ceramic matrix comprises inorganic fibers, inorganic particulate materials and binders.

5. The device as claimed in claim 4, in which the inorganic particulate materials are selected from the group of fumed ceramics, opacifiers, and mixtures thereof.

6. The device as claimed in claim 1, in which the gas-generating endothermic material comprises a mixture of two or more endothermic materials.

7. The device claimed in claim 6, in which two or more of the two or more endothermic materials are gas-generating endothermic materials.

8. The device according to claim 1, wherein the release of gases through the vent enables the neighboring cells to be maintained below a maximum temperature of 200° C.

9. The device according to claim 1, wherein the neighboring cells have a 60% or more reduction in maximum temperature compared to the incident cell.

10. The device according to claim 1, wherein the formulation comprises refractory inorganic fibres.

11. An energy storage device comprising:
    (A) a plurality of electrical cells
    (B) a material for limiting thermal runaway in the device, said cells having an upper normal operating temperature and a higher threshold temperature above which the cells are liable to thermal runaway, the material comprising a ceramic matrix that incorporates an inorganic gas-generating endothermic material, and in which:
  the ceramic matrix is capable of providing thermal insulation properties at and above the upper normal operating temperature;
  the gas-generating endothermic material is selected to undergo one or more endothermic reactions between the upper normal operating temperature and an higher temperature;
  one or more of said reactions results in the evolution of gases;
  the ceramic matrix has sufficient porosity to permit said gases to vent from the material and thereby remove heat from the material;
wherein the material wherein the material for limiting thermal runaway in the device has two or more regions having different concentrations of endothermic gas-generating material, and wherein the material comprises a formulation of:
  Ceramic Oxide: 0-60 wt %
  Opacifier: 0-30 wt %
  Endothermic material : 10-90 wt %
  Dry Binder: 0-10 wt %
  Liquid Binder: 0-60 wt %
  Fibre: 0-60 wt %
with the above named components amounting to greater than 60%, greater than 70%, greater than 80%, or greater than 90% of the composition.

12. The device as claimed in claim 11, having a gradient of endothermic gas-generating material.

13. The device as claimed in claim 11, comprising a surface region having a higher concentration of endothermic gas-generating material than a region within a body of the material.

14. The device as claimed in claim 11, comprising a surface region having a higher concentration of endothermic gas-generating material than a different surface region of the material.

15. The device of claim 11, wherein the material comprises 76% or more by weight endothermic gas-generating material.

16. An energy storage device housing for an energy storage device comprising:
  (A) a plurality of electrical cells
  (B) a material for limiting thermal runaway in the device, said cells having an upper normal operating temperature and a higher threshold temperature above which the cells are liable to thermal runaway, the material comprising a ceramic matrix that incorporates an inorganic gas-generating endothermic material, and in which:
    the ceramic matrix is capable of providing thermal insulation properties at and above the upper normal operating temperature;
    the gas-generating endothermic material is selected to undergo one or more endothermic reactions between the upper normal operating temperature and an higher temperature;
    one or more of said reactions results in the evolution of gases;
    the ceramic matrix has sufficient porosity to permit said gases to vent from the material and thereby remove heat from the material;
    wherein the material wherein the material for limiting thermal runaway in the device has two or more regions having different concentrations of endothermic gas-generating material, and wherein the material comprises a formulation of:
      Ceramic Oxide: 0-60 wt %
      Opacifier: 0-30 wt %
      Endothermic material: >-76-90 wt %
      Dry Binder: 0-10 wt %
      Liquid Binder: 0-60 wt %
      Refractory inorganic fibre: >0-60 wt %
    with the above named components amounting to greater than 60%, greater than 70%, greater than 80%, or greater than 90% of the composition.

* * * * *